(12) United States Patent
Birdsall et al.

(10) Patent No.: US 11,570,751 B2
(45) Date of Patent: Jan. 31, 2023

(54) INSTANT MOBILE ALERTING SYSTEM AND METHOD OF USE

(71) Applicant: Capsol, LLC, Olathe, KS (US)

(72) Inventors: Stephen Birdsall, Olathe, KS (US); Larry Pearce, Stillwell, KS (US)

(73) Assignee: Capsol, LLC, Olathe, KS (US)

( * ) Notice: Subject to any disclaimer, the term of this patent is extended or adjusted under 35 U.S.C. 154(b) by 2 days.

(21) Appl. No.: 17/197,534

(22) Filed: Mar. 10, 2021

(65) Prior Publication Data

US 2021/0289468 A1 Sep. 16, 2021

Related U.S. Application Data

(60) Provisional application No. 62/987,511, filed on Mar. 10, 2020.

(51) Int. Cl.
*H04W 68/02* (2009.01)
*H04W 68/10* (2009.01)
*H04W 4/90* (2018.01)
*H04W 8/18* (2009.01)
*H04W 4/60* (2018.01)

(52) U.S. Cl.
CPC ............ *H04W 68/02* (2013.01); *H04W 4/60* (2018.02); *H04W 4/90* (2018.02); *H04W 8/18* (2013.01); *H04W 68/10* (2013.01)

(58) Field of Classification Search
CPC ......... H04W 68/02; H04W 4/60; H04W 4/90; H04W 8/18; H04W 68/10; H04W 76/50
See application file for complete search history.

(56) References Cited

U.S. PATENT DOCUMENTS

| | | | | |
|---|---|---|---|---|
| 7,895,263 | B1* | 2/2011 | Kirchmeier | G06Q 10/10 707/E17.108 |
| 7,991,393 | B1* | 8/2011 | Cook | H04W 4/029 455/433 |
| 8,010,164 | B1* | 8/2011 | Sennett | H04W 4/14 455/414.3 |
| 9,548,828 | B1* | 1/2017 | Kuznetsov | H04W 4/021 |
| 10,924,891 | B1* | 2/2021 | Mouline | H04W 4/90 |
| 10,939,272 | B1* | 3/2021 | Davis | G06Q 50/265 |
| 2008/0007397 | A1* | 1/2008 | Glazer | G08B 21/0269 340/539.11 |
| 2017/0318442 | A1* | 11/2017 | Roy | H04W 4/185 |
| 2017/0318444 | A1* | 11/2017 | Estes | H04W 4/08 |
| 2018/0330217 | A1* | 11/2018 | Khader | G07C 5/008 |

(Continued)

*Primary Examiner* — Minjung Kim
(74) *Attorney, Agent, or Firm* — Law Office of Mark Brown, LLC; Christopher M. DeBacker

(57) ABSTRACT

A cloud based and on-premise based notification solution for notifying people of a pending, occurring, or ongoing event. These can be emergency, non-emergency or informative in nature. The notification solution is deployed in the form of a mobile software application which can be downloaded by end users to their personal mobile device and used to sync with desired notification system(s). A mobile software application, commonly referred to as an "app," is downloaded to a user's mobile device, such as a smart phone or tablet computer. Once there, the user can be notified of any emergency or non-emergency notifications by others in any networks the user joins. Signing up to new networks for new notifications, the user is never required to provide any personally identifiable information.

11 Claims, 5 Drawing Sheets

(56) References Cited

U.S. PATENT DOCUMENTS

2019/0244220 A1* 8/2019 Drabble ............... H04W 4/021
2019/0387386 A1* 12/2019 Sethi ...................... G08B 25/10
2020/0121533 A1* 4/2020 Will, IV .............. G06Q 10/083

* cited by examiner

INSTANT MOBILE ALERTING SYSTEM AND METHOD OF USE

CROSS-REFERENCE TO RELATED APPLICATION

This application claims priority in U.S. Provisional Patent Application No. 62/987,511 Filed Mar. 10, 2020, which is incorporated herein by reference.

BACKGROUND OF THE INVENTION

1. Field of the Invention

The present invention relates generally to an instant mobile alerting system and method for use thereof, and more specifically to a customizable instant mobile notification system which does not require end user personal information.

2. Description of the Related Art

Mobile data tools are being used in virtually every industry. Apps are downloaded and messages pushed to advertise or promote products and services of all kinds. When information is pushed, the information goes to all who have loaded an app on a smart phone or device. To restrict the information being distributed requires a method or registration or identification; usually requiring the owner of the device to provide a name and email address or mobile phone number. In addition, enabling location services may be a requirement. What is desired is a system which allows for rapid deployment and site specific/owner specific distribution of instant mobile messaging without the requirement of collecting user's personal identification information ("PII") which includes a name, an email address, or a mobile phone number.

Heretofore there has not been available a system or method for a mobile alerting system with the advantages and features of the present invention.

BRIEF SUMMARY OF THE INVENTION

The present invention generally provides a cloud based and on-premise based notification solution for notifying people of a pending, occurring, or ongoing event. These can be emergency, non-emergency or informative in nature. The primary purpose of the application is to provide Mass Notification and Distributed Recipient Mass Notification as defined in the National Fire Protection Association Codes and Standards. Secondarily, messages of a non-urgent event would be sent. The notification solution is deployed in the form of a mobile software application which can be downloaded by end users to their personal mobile device and used to sync with desired notification system(s).

A mobile software application, commonly referred to as an "app," is downloaded to a user's mobile device, such as a smart phone or tablet computer. Once there, the user can be notified of any emergency or non-emergency notifications by others in any networks the user joins.

Signing up to new networks for new notifications, the user is never required to provide any personally identifiable information. The software application can be downloaded via any standard mobile software application store, such as the Apple Store provided by Apple, Inc. of Cupertino, Calif. or the Google Play Store provided by Google LLC of Mountain View, Calif. The software application could also easily be provided and installed directly onto the mobile device using an .apk or similar file for installation.

While other apps are available that require registration, the unique feature of this app is the proprietary anonymous loading of the app on the device. The app uses the telephone device ID for an Android-based device or the vendor ID for IOS devices. Other non-identifiable device IDs would be used for future types of devices. Doing it in this manner, the owner of the device or any other personal information is not obtained. Because the information used to link the phone is not registered to a user, there is no database of people, names, email addresses, cell phone numbers, credit card information or any other personally identifiable information to maintain, sort or protect.

The app is activated by using an activation number or site code number provided to the user from the owner (the company or entity using the site for communication) of the site information. The number could be mass distributed in a way that multiple people would be able to receive it. This could be done by listing the access code on a flyer, website, ticket, bulletin board or any number of other means.

If the owner wanted to use the app for a specific purpose such as a sporting event, civic event or general assembly as an example, the code could be changed for the corresponding event. This would allow the user of the app to no longer receive messages for an event they were no longer a part of or participate in.

By getting the message out instantly (or as close to real time as possible) the app could be used to notify of an emergency where public notification and tips could be used to mitigate the event or increase life safety. This could be used for things such as missing persons, stolen vehicle, robbery, or a number of other emergency situations. This would be particularly applicable for visitors to a community or area. By simply downloading the app and entering a code, they could be immediately kept informed of any life threatening emergency without the need to register or provide and personal information. When they leave, they simply log out to not receive any further messages.

In addition to sending messages prior to and during an emergency, messages could be sent after the event to keep users updated with current needs, trends or information. The app could be used for that event until its use was terminated by the owner simply by changing the access code.

As an option, a specific number could be used as the identification or activation code for the app to transmit tip information. With an optional proprietary program, the tip information would be received for processing that would invoke automated or manual action in accordance with the end user's (applicating client) processes. Using this number would allow the owner to receive tips and notify specific groups for action sent using that contact information (called an "event code"). With an optional proprietary program, the tip information would be received for processing and then forwarded to the end user.

The application contains a counter registering the total number of connected devices. It is representative of the phone connectivity and if users log out or log in, the counter will adjust accordingly when a message is sent. It is not a requirement the user of the phone reply or acknowledge the message to be counted. This counter represents the total number of connected devices indicating how effective the application is in getting the message out to a group of individuals and thus provides feedback to the entity creating the notification.

Acts of violence and threats to our safety increase daily. Whether it is from a man-made situation or a natural disaster, keeping people informed during an emergency is critical. Having a system that could be readily deployed is a benefit to increasing awareness and safety of life. The present invention could be used for, but not limited to the following:

| Storm Warning | Weather Update | Hazardous Chemical | Storm Cleanup |
|---|---|---|---|
| Sporting event | Marathon | Parade | Convention |
| Life Safety Risk | Active Shooter | Prison Escape | Demonstration |
| Bombing | Suspicious Activity | Missing Persons | Community Alerts |
| Vendor Notification | Transient Workers | Repair Crews | Community Leaders |

Activation of the instant mobile alert system can come from various locations. Notification messages can be initiated from a cloud-based server or from a local server and application on premise and connected to the internet for the transmission of data.

Notification Messages can be sent from a control mobile activation app used to transmit emergency or non-emergency messages from a mobile phone or other computing device connected or synchronized to a specific user (owner) location.

This type of mobile connectivity for sending messages provides some beneficial and unique features by allowing messages to be initiated and sent from someone at the actual scene or location, and not requiring someone to be at the workstation. These products work together to provide an overall notification solution.

Life Safety Mass Notification: The industry is governed by codes and standards including regulatory agencies and licensing authorities such as National Fire Protection Association (NFPA), Unified Facilities Criteria (UFC) Underwriters Laboratories (UL), Factory Mutual (FM), International Building Code (IBC), and others. In addition, state and local jurisdictions enforce national, state and local regulations.

Life Safety Mass Notification is an industry specifically designed to identify threats and provide systems to notify people so action can be taken to protect lives and increase safety.

As part of a Life Safety Mass Notification Solution, the present invention would be identified as a part of a Distributed Recipient Mass Notification Solution (DRMNS). This is a standard in the National Fire Protection Association's identification as a part of a complete Mass Notification Solution.

Collection of any data with IMA is limited to the identifier created by the mobile user phone or device when downloading the app. This device ID is used to generate a pseudo-ID on the CAPSOL server for communication. This unique and proprietary method of communication prevents user information from being generated or gathered. That identifier is used to enable the device with the activation code provided by the owner. It is not possible for the app to identify the user and no other information is stored.

There are other programs, products and services used to send alerts to individuals. Push alerts come from various sources such as weather feeds, IPAWS Emergency Notification, county emergency alerts and proprietary programs used to send emergency warnings or alerts. The present invention provides a unique offering by allowing for simple and easy set up with no user personal identifiable information to be collected or stored This allows the alerting to be changed by event or group and when the event is over, changing the activation code disables the notification. Using this app can provide rapid response to a disaster and increase the safety to individuals. Providing a rapid method of deployment for a site-specific need is a strength of this application. Providing large numbers of people with emergency information can help in relief efforts, reduce fear and confusion and increase life safety in an emergency or threatening situation.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Instant Mobile Alert System 2

Figure 1:
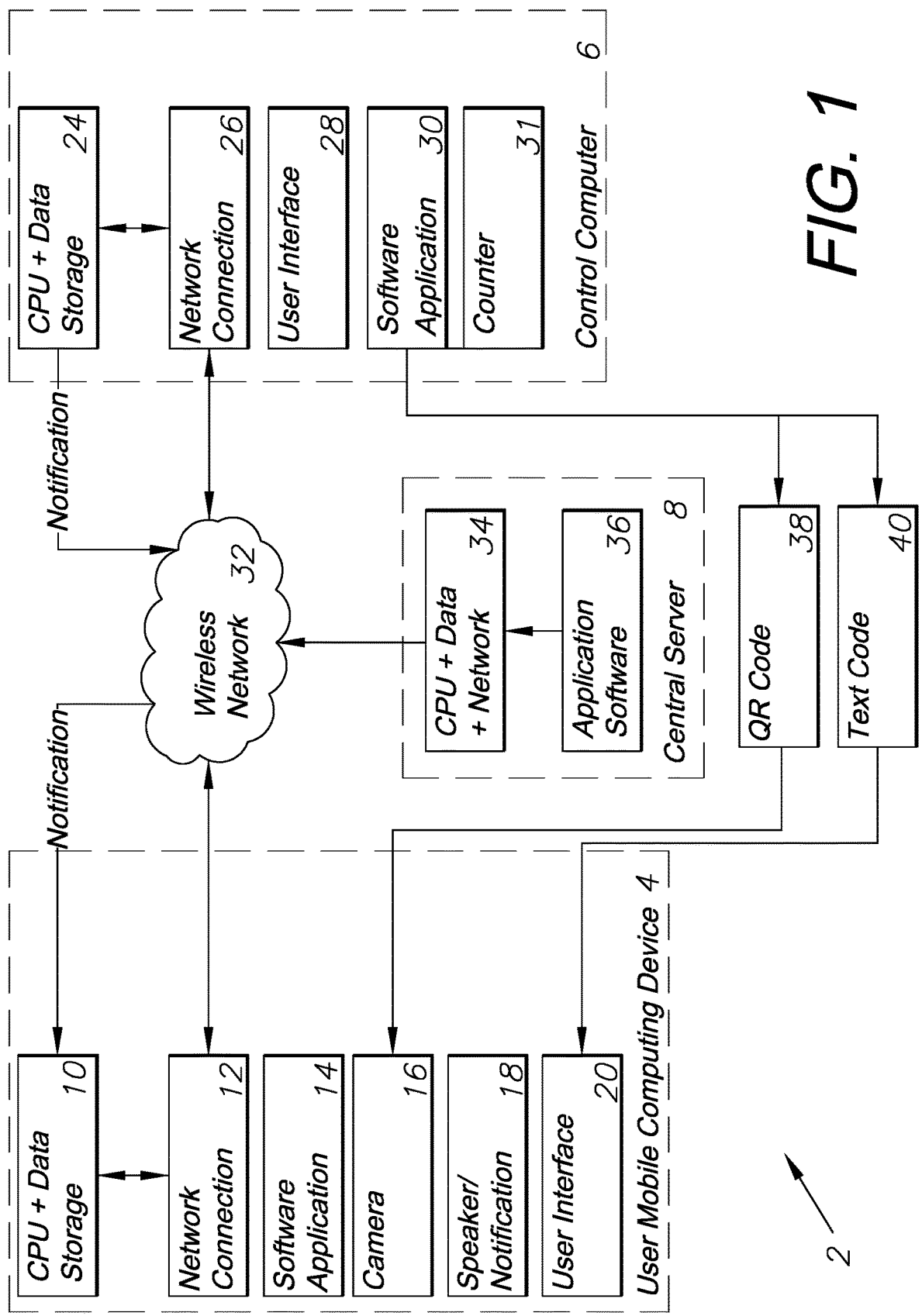
FIG. 1 is a diagrammatic representation of the elements which form a preferred embodiment of the present invention.

FIG. 1 shows an example instant mobile alert system 2 which is intended to provide fast alert notifications to end users who request such notifications without requiring any personal data of the end user to be provided. A user's mobile computing device 4, such as a typical smart phone, tablet, or other mobile computer device, is delivered alerts from a control computer 6 via a wireless network 32 using the elements of the present invention.

The mobile computing device 4 includes standard elements including a CPU and data storage 10, network connection 12 for connecting to the wireless network 32, a software application 14 stored in the data storage and used to interface with the present invention's other elements, a camera 16, a speaker 18 or other notification device (e.g. vibration, flashing lights), and a user interface 20, such as a touchscreen.

The control computer 6 similarly includes a CPU+data storage 24, a network connection 26 for communicating through the wireless network, a user interface 28, and a software application 30.

A central server 8 could also be connected to the mobile computing device 4 and control computer 6 through the wireless network 32 for providing the software applications 14, 30 to be downloaded and used by the two computing devices 4, 6. The central server could provide additional features and functions to enable the present invention as needed.

The software application 30 on the control computer 6 is used to generate a code, such as a QR code 38 or unique text-based code 40. This code is then used by the user by either scanning the QR code 38 with the camera 16 of the mobile computing device 4, or by entering the text code 40 via the user interface 20, using the software application 14. Once this is done, alerts sent from the control computer 6 pertaining to that particular code will be sent to the mobile computing device 4 with the software application 14 which has the appropriate code entered into its memory.

In order to identify devices to send messages to, the software applications 14, 30 use the device ID for the Android Device or the vendor ID for IOS devices to correctly send notices to the user who has authorized the notifications. Other non-identifiable device IDs would be used for future types of devices. This secures the user from requiring to supply any personal information.

The control computer 6 software application 30 may include a counter 31 for recognizing the total number of devices connected to a particular code or control computer. As users log in/register and/or log out/unregister with the control computer notifications, the counter will adjust accordingly to inform the control computer what level of interest there is in a notification code. This counter only identifies the aggregate number of connected devices, and not any individual devices or identifying information of any user.

Figure 2:
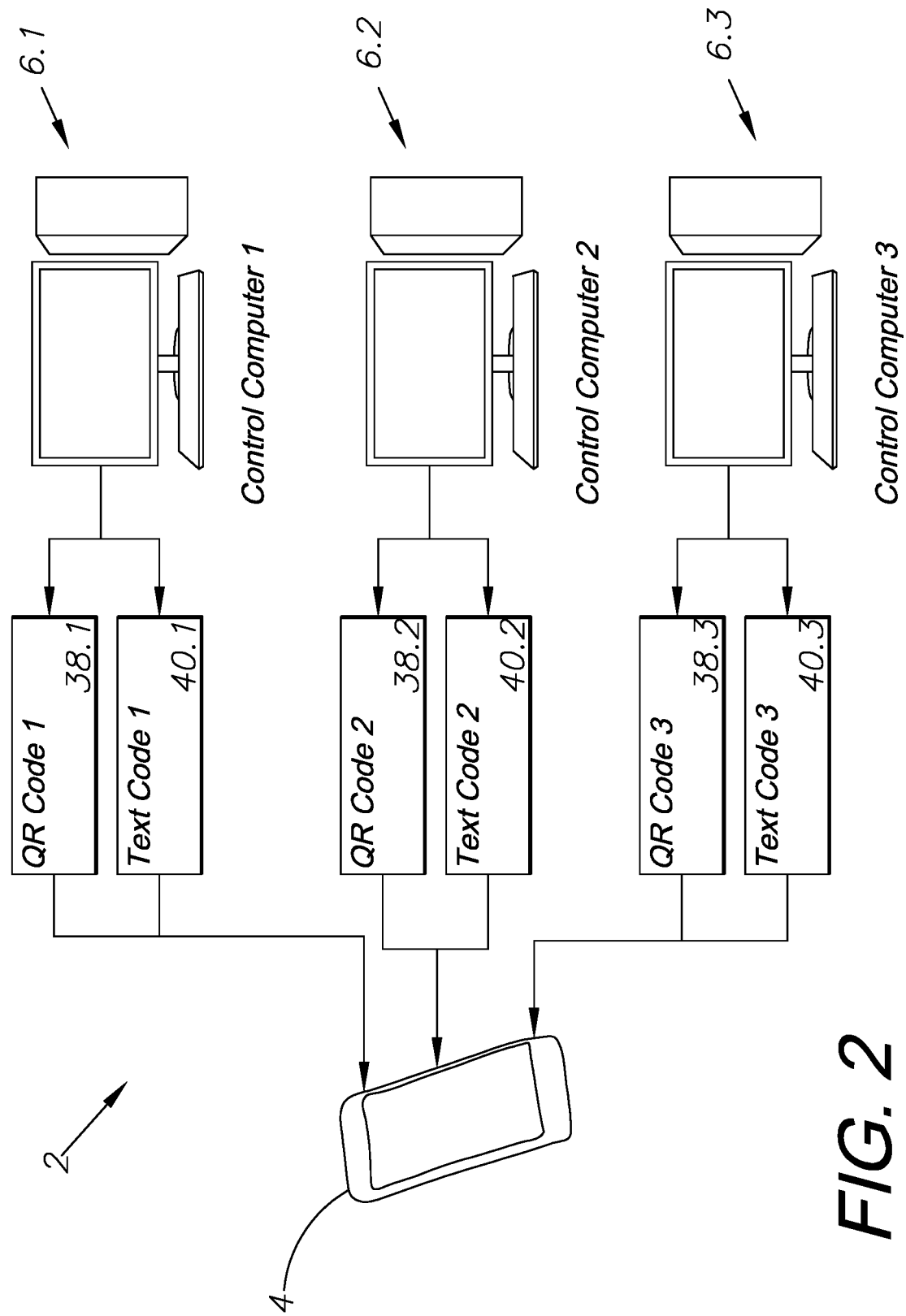
FIG. 2 is another diagrammatic representation thereof.

FIG. 2 shows how multiple QR codes 38.1, 38.2, 38.3 or text codes 40.1, 40.2, 40.3 can be generated by respectively different control computers 6.1, 6.2, 6.3 and all be stored on the same mobile computing device 4, such that multiple different alerts from multiple different sources can be received by the same device. This also applies when the same control computer provides multiple different codes, and the same mobile computing device will be able to pair with multiple alert codes from the same control computer.

Figure 3:
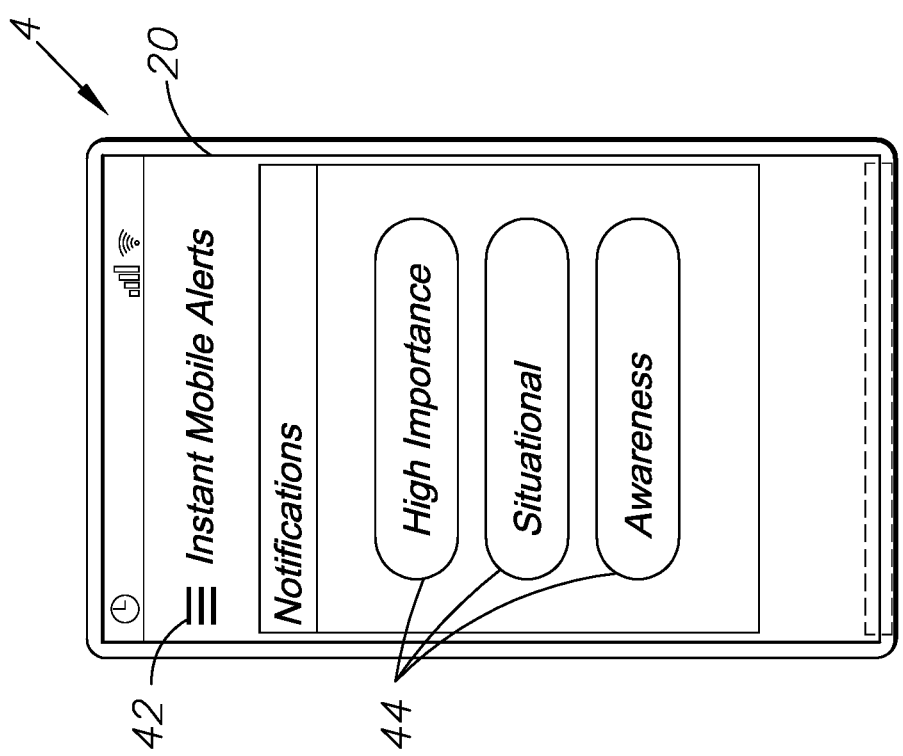
FIG. 3 is a front elevational view of a mobile computing device element of the present invention displaying a user interface.

FIG. 3 shows a user interface 20 of a mobile computing device 4 running the software application 14. The user interface here shows a menu selection button 42 allowing the user to navigate through the software application. Also shown in this view are multiple notifications 44 of varying importance which the user can select to view received notifications.

Figure 4:
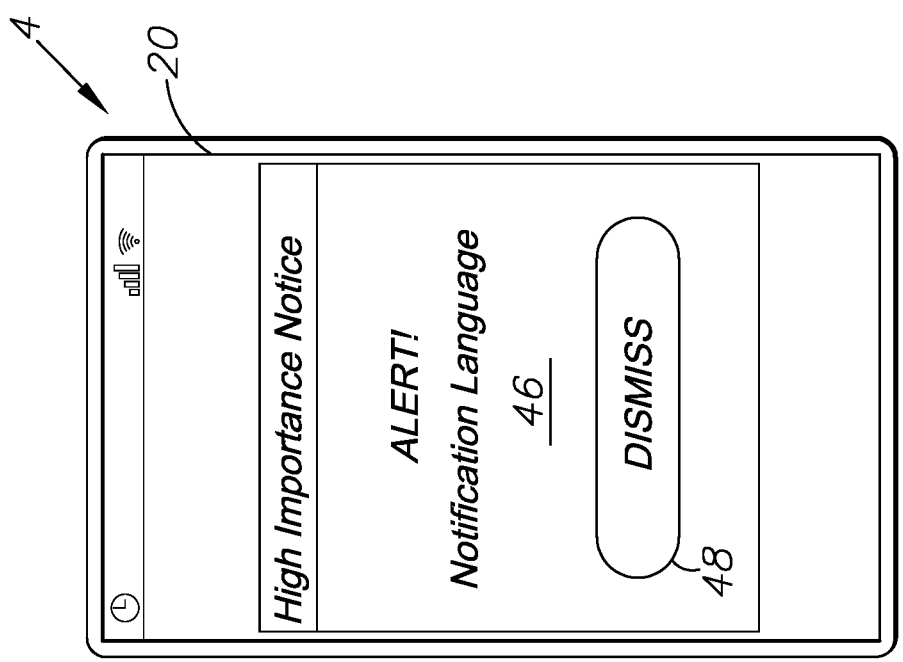
FIG. 4 is a front elevational view of a mobile computing device element of the present invention displaying another user interface.

FIG. 4 shows another user interface 20 where an alert appears on the mobile computing device's screen, displaying that alert to the user, and providing a dismiss button 48 to let the user selectively dismiss the alert after viewing it. A button could also be present to provide the user additional information about the received alert.

Figure 5:
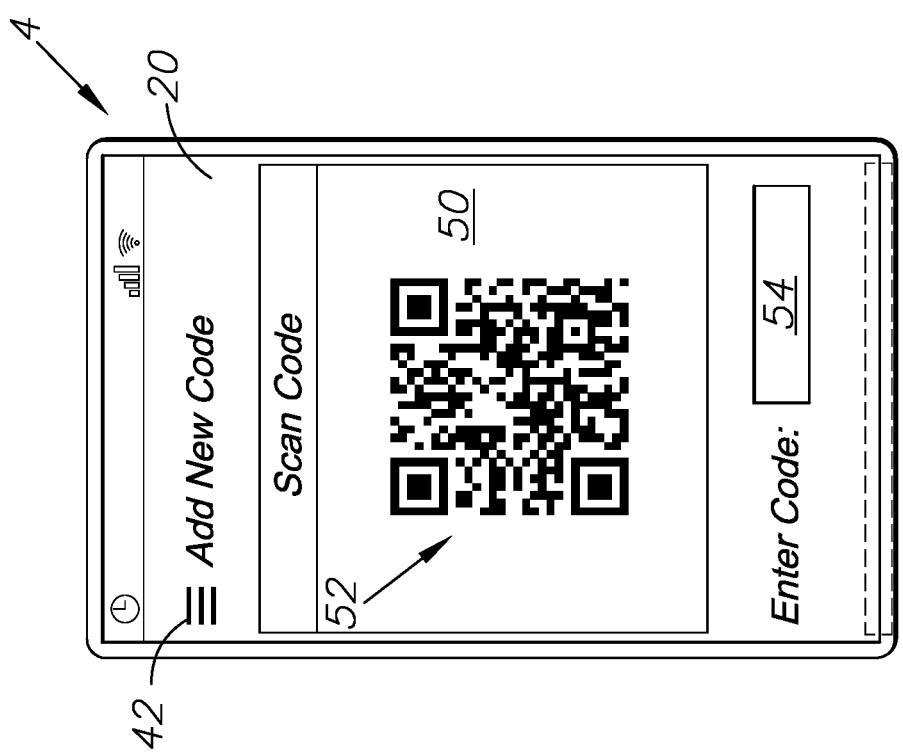
FIG. 5 is a front elevational view of a mobile computing device element of the present invention displaying yet another user interface.

FIG. 5 shows the user interface 20 displaying a QR code 52 within a view port window 50 displaying what the camera 16 views. An alternative code entry space 54 allows the user to enter a text-based code.

Figure 6:
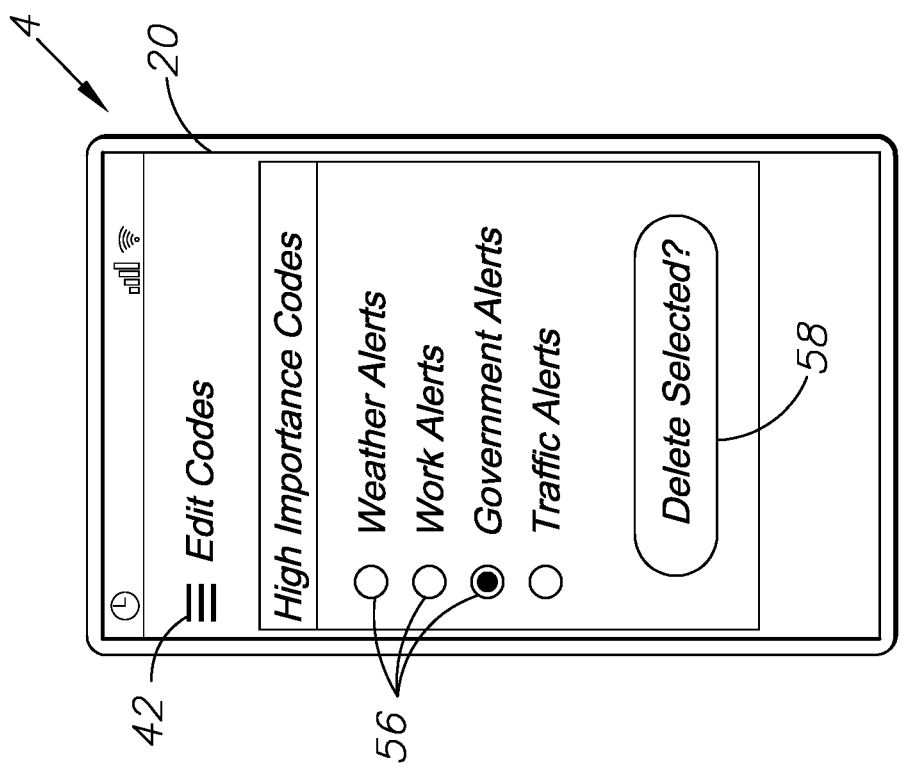
FIG. 6 is a front elevational view of a mobile computing device element of the present invention displaying yet another user interface.

FIG. 6 shows a user interface where the user can edit their subscribed-to alert networks and select various network options 56 and select to remove them via the delete button 58.

Figure 7:
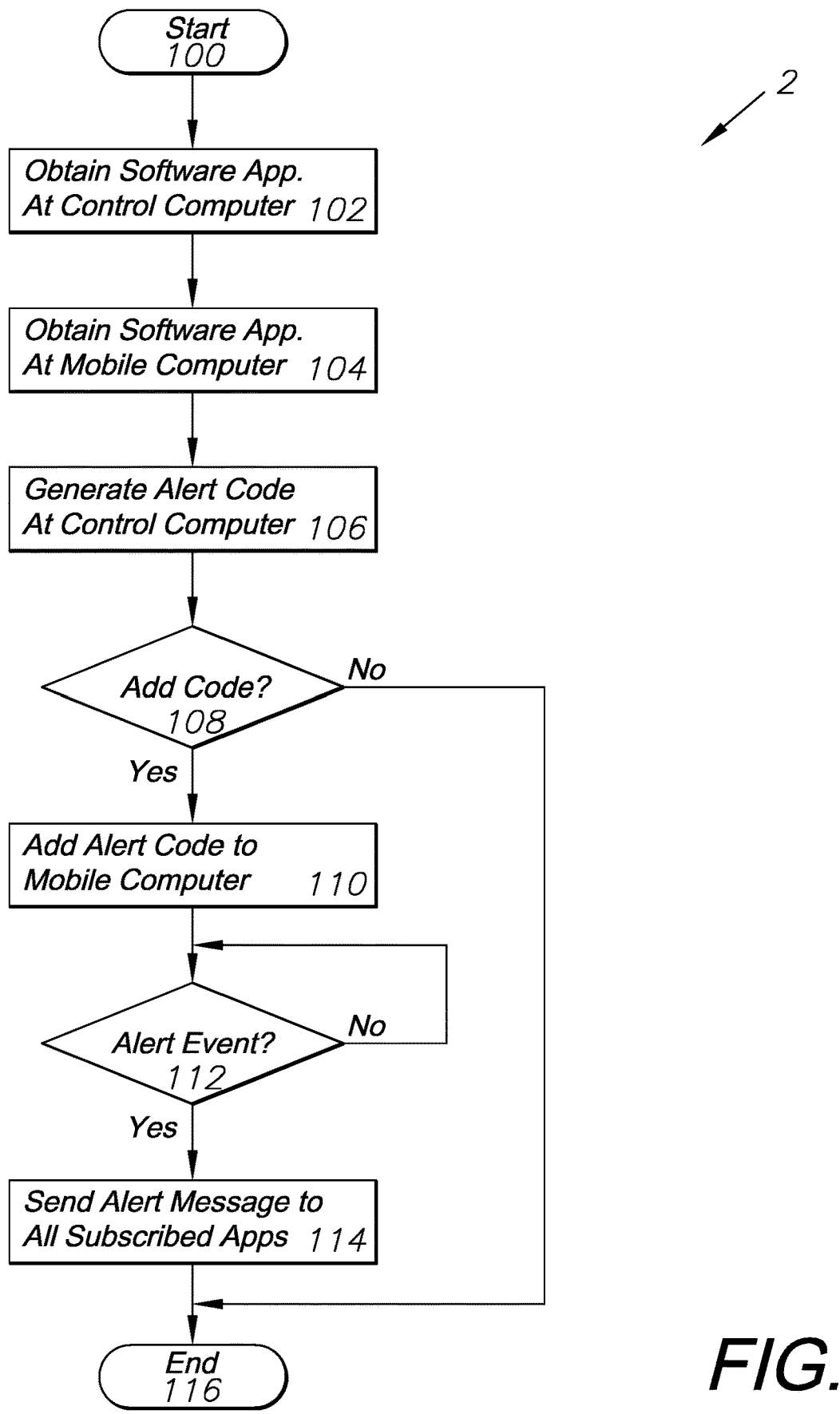
FIG. 7 is a flowchart diagramming the steps taken in practicing an embodiment of the present invention.

FIG. 7 is a flowchart diagramming steps taken in practicing an embodiment of the present invention. The process starts at 100 and the control computer obtains the software application 30 at 102. Similarly, the mobile computing device 4 receives the software application 14 at 104. The control computer is then used to generate an alert code, such as a QR code 38 or text code 40, at 106.

If the user elects not to add the code at 108, the process regarding that particular code ends at 116 with respect to this user. If the user does add the code at 108, the alert notification subscription is added to the mobile computing device at 110. If there is no alert event at 112, nothing happens and the process remains ready. If an alert event does occur at 112, the alert is sent out from the control computer to the mobile computing device at 114 via the respective software applications 14, 30. The process then ends at 116.

Because the user only needs to enter in a unique code to be subscribed to the mobile alert system set up by a control computer, no personally identifiable information is ever provided by the user. This makes it an easy opt in/opt out alert system for any purposes from weather warnings, local events, work-place notices, or any conceivable notification purpose without requiring the user to give up any privacy or personal information.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile notification and alert messaging system comprising:
- a control computer comprising a central processing unit (CPU), data storage storing a software application accessible by said control computer CPU, a user interface, and a network connection to a communications network;
- a mobile computer comprising a CPU, data storage storing a mobile software application accessible by said mobile computer CPU, a mobile user interface, a camera; and a mobile network connection to said communications network;
- an alert subscription code generated by said control computer via said software application, said alert subscription code provided to said mobile computer;
- said subscription code being selectively enterable with said mobile computer software application;
- receiving alerts from said control computer at said mobile computer via said mobile software application without being required to submit any additional information; and
- wherein the control computer is unable to identify a user of said mobile computer and does not store and use any user identifiable data related to a user of said mobile computer to send alerts to said mobile computer after receiving said alert subscription code from said mobile computer.

2. The system of claim 1, wherein said alert subscription code comprises a QR code to be scanned using said camera of said mobile computer.

3. The system of claim 1, wherein said alert subscription code comprises a numerical code to be entered via said user interface of said mobile computer.

4. The system of claim 1, wherein said software application accessible by said control computer CPU comprising a counter configured to count a total number of devices associated with said alert subscription code.

5. The system of claim 1, wherein said alert subscription code is associated with an event selected from the list comprising: natural disasters, traffic reports, local events, law enforcement activity, and general emergency or non-emergency event occurrences.

6. The system of claim 1, wherein no personal information is transferred from said mobile computer to said control computer in association with the use of said mobile notification and alert messaging system.

7. A method of selectively providing alerts, the method comprising the steps:
providing a control computer comprising a central processing unit (CPU), data storage storing a software application accessible by said control computer CPU, a user interface, and a network connection to a communications network;
providing a mobile computer comprising a CPU, data storage storing a mobile software application accessible by said mobile computer CPU, a mobile user interface, a camera; and a mobile network connection to said communications network, wherein
generating, with said control computer, an alert subscription code;
providing access to said alert subscription code to said mobile computer;
selectively entering said subscription code with said mobile computer software application without being submitting any additional information;
triggering an alert notification with an event;
sending said alert notification from said control computer to said mobile computer via said control computer software application and said mobile computer software application; and
receiving said alert notification at said mobile computer without being required to submit any additional information;
wherein the control computer is unable to identify a user of said mobile computer and does not store and use any user identifiable data related to a user of said mobile computer to send alerts to said mobile computer after receiving said alert subscription code from said mobile computer.

8. The method of claim 7, wherein said alert subscription code comprises a QR code to be scanned using said camera of said mobile computer.

9. The method of claim 7, wherein said alert subscription code comprises a numerical code to be entered via said user interface of said mobile computer.

10. The method of claim 7, further comprising the step of counting a number of connected mobile computers to said control computer associated with said alert subscription code.

11. The method of claim 7, wherein no personal information is transferred from said mobile computer to said control computer.

* * * * *